Aug. 17, 1937.   R. D. LACOE   2,090,132
AIRCRAFT BLIND FLYING HOOD
Filed Feb. 2, 1935   2 Sheets-Sheet 1

INVENTOR
Ralph D. Lacoe
BY A. B. Bowman
ATTORNEY

Aug. 17, 1937.  R. D. LACOE  2,090,132
AIRCRAFT BLIND FLYING HOOD
Filed Feb. 2, 1935  2 Sheets-Sheet 2
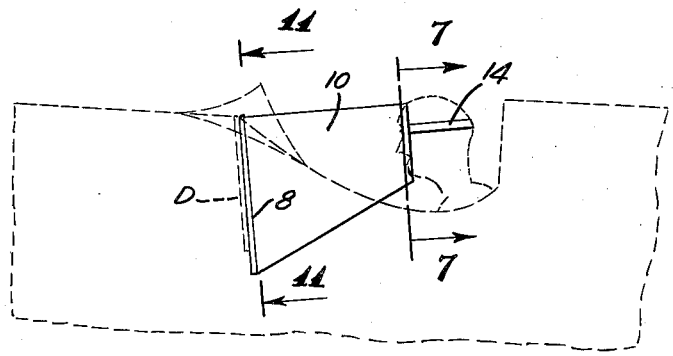
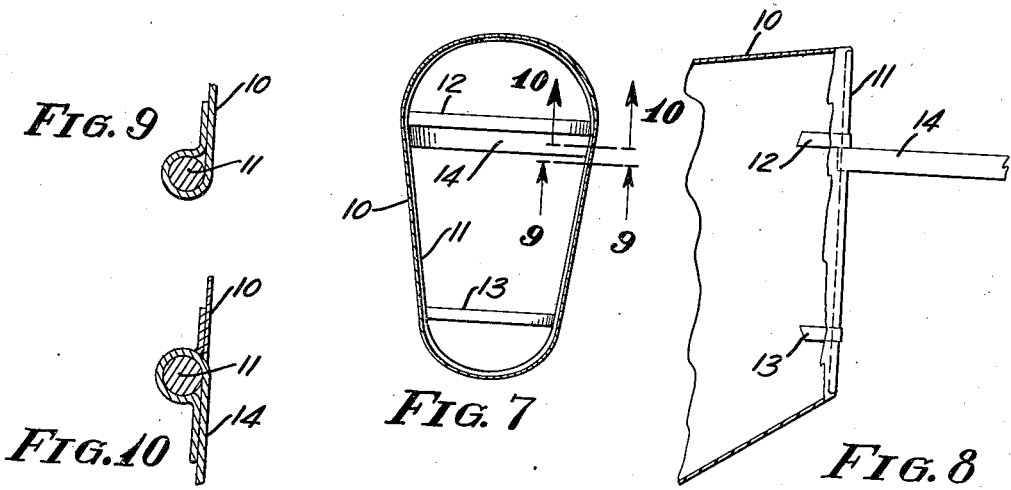
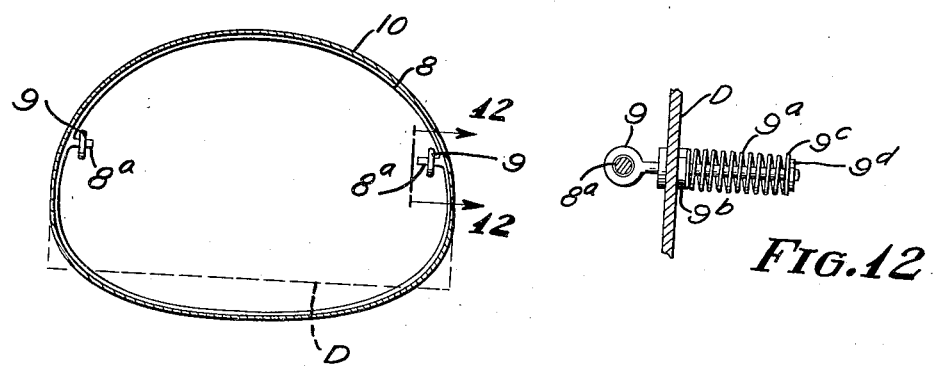
INVENTOR
Ralph D. Lacoe
BY  A. B. Bowman
ATTORNEY Patented Aug. 17, 1937

2,090,132

UNITED STATES PATENT OFFICE 2,090,132

AIRCRAFT BLIND-FLYING HOOD

Ralph D. Lacoe, San Diego, Calif.

Application February 2, 1935, Serial No. 4,660

9 Claims. (Cl. 35—12)

My invention relates to a hood to be used for blind flying in connection with aircraft, and the objects of my invention are:

First, to provide a hood to cover the forward portion of the face of the aircraft pilot so that nothing can be seen by the pilot while the hood is in place except the dash including the instruments on the dash of the aircraft;

Second, to provide a hood of this class which is readily applicable to the cockpits of airplanes now in use;

Third, to provide an apparatus of this class which provides sufficient light for seeing the instruments but by the use of which nothing else can be seen by the aircraft pilot;

Fourth, to provide an apparatus of this class in which the pilot may assume his usual position in the cockpit while blind flying;

Fifth, to provide a hood of this class which may be quickly and readily removed when necessary;

Sixth, to provide a hood of this class in which the head of the pilot may shift a reasonable distance backwardly and forwardly without affecting the operation of the hood;

Seventh, to provide a hood of this class which obstructs the co-pilot's view to a minimum when used in an aircraft in which the controls are side by side, and Eighth, to provide a hood of this class which is very simple and economical of construction, durable, efficient in its action, and which will not readily deteriorate or get out of order.

Figure 1:
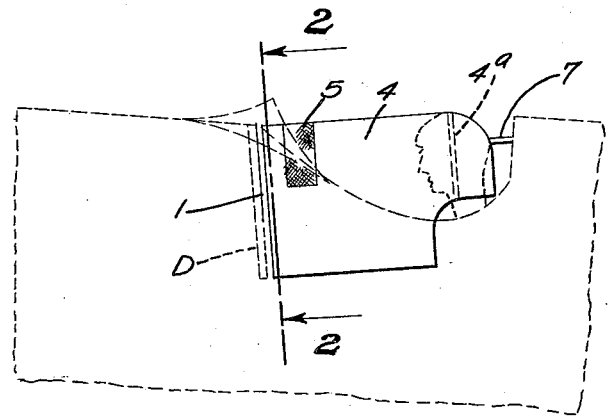
Figure 2:
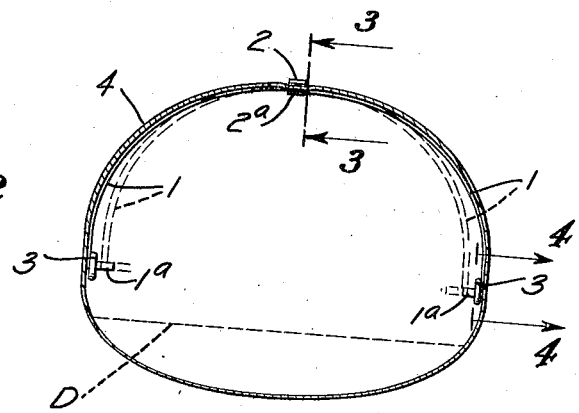
Figures 3, 4:
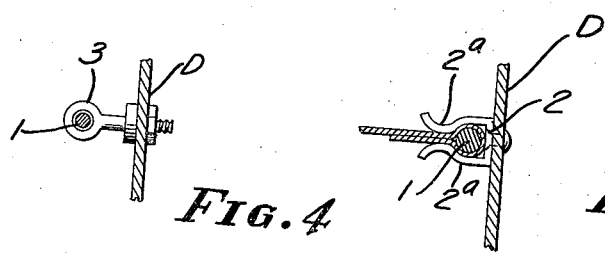
Figure 5:
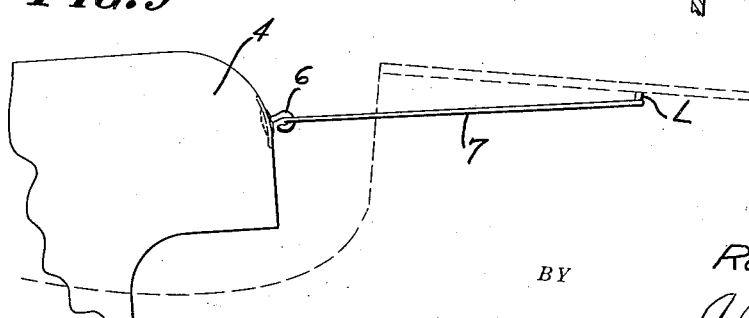

With these and other objects in view as will appear hereinafter, my invention consists of certain novel features of construction, combination and arrangement of parts and portions, and certain modifications thereof, as will be hereinafter described in detail and particularly set forth in the appended claims, reference being had to the accompanying drawings and to the characters of reference thereon which form a part of this application, in which:

Figure 1 is a side elevational view of my hood in its preferred form shown in position on the head of the pilot and showing the aircraft cockpit and adjacent portions by dotted lines; Fig. 2 is an enlarged sectional view through 2—2 of Fig. 1; Fig. 3 a further enlarged sectional view through 3—3 of Fig. 2; Fig. 4 an enlarged sectional view through 4—4 of Fig. 2; and Fig. 5 an enlarged fragmentary elevational view of the rear portion of the hood shown in relation with the aircraft cockpit and showing the rear end support of the hood; Fig. 6 is a side elevational view similar to Fig. 1 showing a modified form of the hood; Fig. 7 is an enlarged sectional view through 7—7 of Fig. 6; Fig. 8 is an enlarged side elevational view of the head support portion shown fragmentarily and partially in section to facilitate the illustration; Fig. 9 is an enlarged fragmentary sectional view through 9—9 of Fig. 7; Fig. 10 is an enlarged fragmentary sectional view through 10—10 of Fig. 7; Fig. 11 is an enlarged sectional view through 11—11 of Fig. 6, and Fig. 12 is an enlarged sectional view through 12—12 of Fig. 11.

Similar characters of reference refer to similar parts and portions throughout the several views of the drawings.

In the preferred form shown in Figs. 1 to 5, inclusive, there is provided a hood support 1 which is preferably constucted of spring material such as brass and which does not affect the magnetically controlled instruments of the aircraft. It is substantially semi-circular in shape and is supported at the upper middle portion of the dash of the aircraft by means of a clip member 2, shown best in Figs. 2 and 3 of the drawings. This clip member is provided with bifurcated spring clip portions 2a between which the member 1 is inserted and the members 2a spread sufficiently to permit the insertion. This clip member is secured to the dash D of the aircraft at its upper side. This member 1 is provided with end lug portions 1a at its opposite ends which are adapted to be placed in the eye members 3 by springing the ends of the member 1 inwardly, as shown by dotted lines in Fig. 2 of the drawings, then when properly positioned, releasing the same. These members 3 are secured to the dash at positions downwardly and outwardly from the clip member 2, as shown best in Fig. 2 of the drawings.

Supported on the member 1 is the hood member 4 which is composed of fabric sufficiently opaque so that objects cannot be discerned therethrough and is shaped in oval form in cross section, as shown best in Fig. 2 of the drawings, the lower portion being suspended loosely from the lower portion of the support 1 at opposite ends. This hood 4 extends backwardly to near the back side of the cockpit and at its back side is shaped to substantially fit the head of the pilot and pass over and enclose the head, as shown best in Figs. 1 and 5 of the drawings. It is provided with a reinforcing strap 4a, shown by dotted lines in Fig. 1 of the drawings, which passes around the head of the pilot near the ears. This opaque member 4 is provided with a substantially translucent window member 5 which is preferably fabric and is positioned near the front portion of the hood, as shown best in Fig. 1 of the drawings, and is adapted to admit sufficient light to light the instrument board on the dash and provide light for operating purposes and extends part way around the upper side a slight distance back of the dash. This hood is supported at its rear end by means of a hook 6 secured centrally at the portion back of the head of the pilot and connected with this hook is an elastic member 7 which is secured to a lug L secured to the aircraft some distance back of the cockpit to permit sufficient movement and stretch of the member 7 to permit the quick and ready removal of the hood from the head of the pilot.

In the modified form of construction shown in Figs. 6 to 12, inclusive, there is provided a hood member 10 which is substantially oval shape in cross section and gradually decreases in size and changes in shape from the front portion backwardly to fit the front portion of the head of the pilot. This is preferably made of elastic material but may be ordinary fabric without elastic and is made of material that is slightly translucent to permit light enough so that the instrument board on the dash may be seen by the pilot when the hood is in position but outside objects may not be observed. This hood 10 is supported at its forward portion by a substantially oval shaped spring member 8 made of similar material to that of the member 1 in Fig. 1 of the drawings. It is supported on the dash by means of lugs 8a extending inwardly intermediate the upper and lower sides which fit into eye members 9 which are mounted on the dash D so as to be shifted therein, as shown in Fig. 12 of the drawings, and provided with a compression spring 9a supported thereon between washers 9b and 9c by means of a nut 9d, thus providing yieldable means for the member 9 and thus permitting the hood 10 together with the support 8 to be shifted backwardly if desired.

This hood member 10 is provided at its rear portion with a reinforcing head fitting strip 11 which is adapted to fit against the front portion of the face and head of the pilot and is secured to the back portion of the hood 10. Secured to this strip 11 are two strips 12 and 13 which are adapted to rest against the forehead and chin of the pilot and there is also provided a head band 14 which passes around the back of the head of the pilot preferably of elastic material and adapted to hold the hood in position against the front portion of the head of the pilot. The hood member 10 is supported around the member 11, as shown best in Fig. 9 of the drawings, and the member 14 secured around the member 11, as shown best in Fig. 10 of the drawings.

Though I have shown and described a particular construction, combination and arrangement of parts and portions, and a certain modification thereof, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In an aircraft blind flying hood, a substantially closed, flexible, translucent hood member secured at its front portion to the back side of the dash of an aircraft, said front portion surrounding the instrument board and said hood extending backwardly and enclosing the eyes of the pilot and supported by the head of the pilot.

2. In an aircraft blind flying hood, a substantially closed, flexible, translucent hood member secured at its front portion to the back side of the dash of an aircraft, said front portion surrounding the instrument board and said hood extending backwardly and enclosing the eyes of the pilot and supported by the head of the pilot, and clip means associated with the front portion of said hood and said dash and readily connecting and disconnecting the front portion of said hood with the dash of the aircraft.

3. In an aircraft blind flying hood, a substantially closed, flexible, translucent hood member secured at its front portion to the back side of the dash of an aircraft, said front portion surrounding the instrument board and said hood extending backwardly and enclosing the eyes of the pilot and supported by the head of the pilot, clip means associated with the front portion of said hood and said dash and readily connecting and disconnecting the front portion of said hood with the dash of the aircraft, and resilient means in connection with said hood supported at the back side of the pilot's head and to the aircraft adapted to permit the shifting of the pilot's head when engaged by said hood.

4. In an aircraft blind flying hood, a spring member in extended curved form supported above and to the sides of the instrument board of an aircraft, and a flexible hood member of conforming shape forming an enclosure secured at its one end to said spring member.

5. In an aircraft blind flying hood, a spring member in extended curved form supported above and to the sides of the instrument board of an aircraft, a flexible hood member of conforming shape forming an enclosure secured at its one end to said spring member, and clip means for readily removably connecting said spring member with the aircraft dash intermediate the ends and at the ends of said spring.

6. In an aircraft blind flying hood, a spring member in extended curved form supported above and to the sides of the instrument board of an aircraft, a flexible hood member of conforming shape forming an enclosure secured at its one end to said spring member, clip means for readily removably connecting said spring member with the aircraft dash intermediate the ends and at the ends of said spring, and head fitting and supporting means at the opposite end of said hood.

7. In an aircraft blind flying hood, a spring member in extended curved form supported above and to the sides of the instrument board of an aircraft, a flexible hood member of conforming shape forming an enclosure secured at its one end to said spring member, clip means for readily removably connecting said spring member with the aircraft dash intermediate the ends and at the ends of said spring, head fitting and supporting means at the opposite end of said hood, and resilient means connecting said hood and said aircraft backwardly of said head fitting means.

8. In an aircraft blind flying hood, a spring member in extended curved form supported above and to the sides of the instrument board of an aircraft, a flexible hood member of conforming shape forming an enclosure secured at its one end to said spring member, clip means for readily removably connecting said spring member with the aircraft dash intermediate the ends and at the ends of said spring, head fitting and supporting means at the opposite end of said hood, resilient means connecting said hood and said aircraft, and a light transmitting window in said hood adjacent the instrument board of the aircraft backwardly of said head fitting means.

9. In an aircraft blind flying hood, a hood member adapted to fit around and enclose the front portion of the head of the pilot at its one end and secured at its opposite end to the instrument board around the indicating instruments of said aircraft so as to enclose said indicating instruments.

RALPH D. LACOE.